United States Patent [19]
Stutzenberger

[11] Patent Number: 5,605,042
[45] Date of Patent: Feb. 25, 1997

[54] ARRANGEMENT FOR THE AFTERTREATMENT OF EXHAUST GASES

[75] Inventor: Heinz Stutzenberger, Vaihingen, Germany

[73] Assignee: Robert Bosch GmbH, Stuttgart, Germany

[21] Appl. No.: 542,203

[22] Filed: Oct. 12, 1995

[30] Foreign Application Priority Data

Oct. 12, 1994 [DE] Germany .................... 44 36 397.4

[51] Int. Cl.⁶ ..................................... F01N 3/00
[52] U.S. Cl. .............................. 60/286; 60/301
[58] Field of Search ....................... 60/286, 301

[56] References Cited

U.S. PATENT DOCUMENTS

| | | | |
|---|---|---|---|
| 3,945,204 | 3/1976 | Knap | 60/286 |
| 4,321,972 | 3/1982 | Achard | 60/301 |
| 4,854,123 | 8/1989 | Inoue | 60/286 |
| 5,021,227 | 6/1991 | Kobayashi et al. | 60/301 |
| 5,343,702 | 9/1994 | Miyajima et al. | 60/301 |
| 5,349,816 | 9/1994 | Sanbayashi et al. | 60/301 |

FOREIGN PATENT DOCUMENTS 0503882  9/1992  European Pat. Off. .

OTHER PUBLICATIONS

Schadstoffreduzierung Und Kraftstoffverbrauch Von PKW–Verbrennungs–Motoren by F. Schaefer and R. Van Basshuysen p. 115.

*Primary Examiner*—John T. Kwon
*Attorney, Agent, or Firm*—Edwin E. Greigg; Ronald E. Greigg

[57] ABSTRACT

The invention sets forth an arrangement for the aftertreatment of exhaust gases from a compression-ignition internal combustion engine, in which, to improve the operation of a reducing catalytic converter, a reducing agent is injected into the exhaust gas fed to the catalytic converter. Injection is performed by virtue of an electrically controlled metering valve which is combined in a common housing with a control valve. This control valve serves for the controlled introduction of compressed air supplied, in which a quantity of reducing agent made ready by the metering valve is prepared and introduced intermittently into the exhaust gas. This serves, in particular, to avoid urea deposition and clogging in the metering valve and the control valve and for the optimum preparation of the reducing agent introduced.

20 Claims, 2 Drawing Sheets

ARRANGEMENT FOR THE AFTERTREATMENT OF EXHAUST GASES

PRIOR ART

Because of the high excess of oxygen with which they are operated, compression-ignition internal combustion engines tend toward a high $NO_x$ emission. This occurs to a greater degree in the case of compression-ignition internal combustion engines which operate with direct injection into the main combustion space. In order to reduce this emission, there is the possibility of subsequent $NO_x$ reduction by means of a reducing catalytic converter. Suitable catalyst systems for this purpose are, for example, those which are zeolite based. These catalyst systems are suitable above all for use at relatively low exhaust gas temperatures, such as those which occur in the case of exhaust gases from compression-ignition internal combustion engines. The temperatures of these exhaust gases are far lower than in the case of the exhaust gases of applied-ignition internal combustion engines. This low exhaust gas temperature makes lightoff of the reaction of a reducing catalytic converter more difficult. To promote the reduction process, it has already been proposed in the publication by F. Schafer and R. van Basshuysen entitled "Schadstoffreduzierung und Kraftstoffverbrauch von PKW-Verbrennungsmotoren" [Pollutant reduction and fuel consumption in passenger-vehicle engines], page 115, Springer-Verlag, to introduce reducing agent in the form of an aqueous urea solution into the exhaust gas upstream of a $NO_x$ reducing catalytic converter, using an electrically controlled valve. The urea dispensed by the electrically controlled metering valve is introduced by means of compressed air, which is at the same time used to prepressurize the closed urea storage tank to a delivery pressure to ensure that the constant pressure drop necessary for metering occurs at the electrically controlled valve. This pressure drop must also guarantee the finely dispersed preparation of the urea such that the $NH_3$ required for the desired reduction of the $NO_x$ components in the exhaust gas will be formed at the latest in the catalytic converter by decomposition of the urea compound in conjunction with the action of heat. This arrangement is exposed to high exhaust gas temperatures and there is the risk that the electrically controlled metering valve will stick, especially in the case of intermittent operation. The air jacketing of the outlet opening of the electrically controlled metering valve as provided in the prior art does not guarantee that the required fine dispersion of the metered urea will occur to the desired degree. Particularly because of the long conduit provided in the prior art to connect the metering point and the entry point of the metered urea into the exhaust gas, there is here the risk that already finely dispersed urea will recombine into large droplets and that an irregular metering rate will occur.

ADVANTAGES OF THE INVENTION

In contrast, the solution according to the invention with the defining features of patent claim 1 has the advantage that air and reducing agent in finely dispersed form are introduced into the exhaust gas via the outlet opening with the aid of the control valve and of the compressed air stream controlled by it, without droplets coalescing again since further preparation of reducing agent finely dispersed in air takes place in the hot exhaust gas. In this way, the quantity of reducing agent to be introduced can be precontrolled with precision, and the compressed air supplied ensures the good preparation of the urea solution by way of the discharge process at the outlet opening of the control valve.

In an advantageous further development of the arrangement according to the invention, the control valve is cooled by a cooling medium which flows around a common carrier which holds with valve. It is advantageous here also at the same time to cool the metering valve, which is arranged together with the control valve in a common carrier housing. By virtue of the possibility of holding reducing agent ahead of the outlet point of the metering valve, the airstream is subject to a heavy swirl at the restricting transition to the exhaust gas carrying part of the exhaust system of the internal combustion engine when the control valve is opened, and it prepares the reducing agent in an optimum manner. The reducing agent used is advantageously urea in an aqueous solution. This can be used in the solution according to the invention without the risk of metering cross sections being clogged and offers a high degree of assistance to the reduction taking place in the reducing catalytic converter.

BRIEF DESCRIPTION OF THE DRAWINGS

An exemplary embodiment of the invention is illustrated in the drawings and is explained in greater detail in the description which follows.

DESCRIPTION OF THE EXEMPLARY EMBODIMENT

Figure 1:
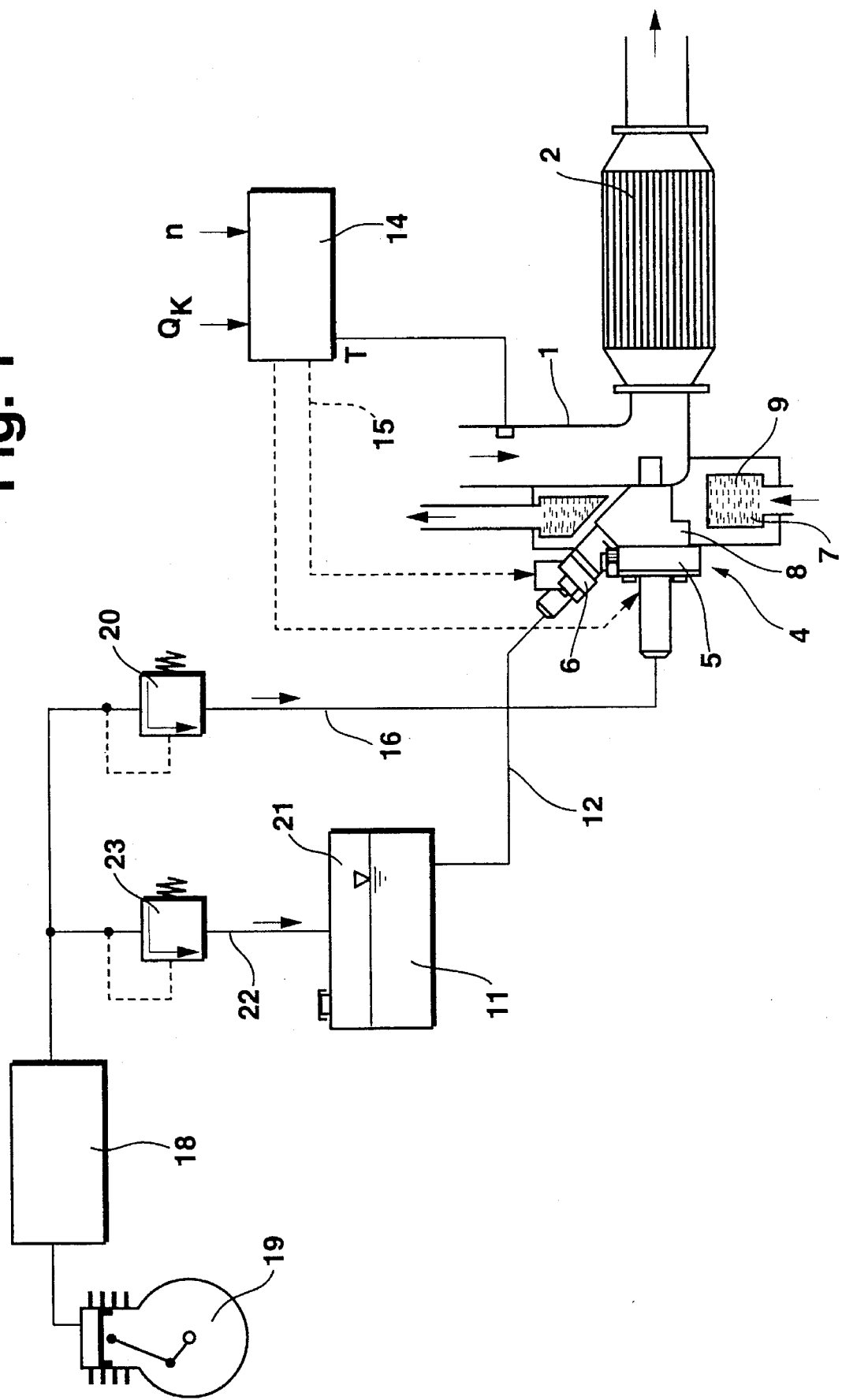
FIG. 1 shows a schematic representation of the arrangement according to the invention and FIG. 2 shows the configuration of the combined metering and control valve in detail without the associated cooling device.

The drawing shows only part of the exhaust system of a compression-ignition diesel internal combustion engine which can operate with direct or indirect injection. Of said exhaust system, an exhaust pipe 1 opens into a reducing catalytic converter 2, which serves to reduce $NO_x$ components of the exhaust gas and, for this purpose, is arranged as close as possible to the outlet of the exhaust gas from the individual cylinders of the internal combustion engine. This is important because the exhaust gas temperature in the exhaust gas of compression-ignition internal combustion engines is relatively low and the ability to function of a catalytic converter is lowered by a temperature which decreases after emergence with increasing distance from the combustion space. As the catalytic converter, use can be made, for example, of what is referred to as a DENOX catalytic converter, which is of zeolite based construction. These catalytic converters have a relatively low operating temperature at which a reducing operation can be carried out. An oxidizing catalytic converter can also be employed downstream of the said catalytic converter, if required and this oxidizing catalytic converter can then perform afterburning of any unburnt components in the exhaust gas as well.

A metering device 4 is inserted into the wall of the exhaust pipe 1 upstream of the reducing catalytic converter 2. This metering device has a control valve 5, a metering valve 6 and a cooling device 7. The cooling device is designed as a cooling jacket 9 which surrounds a common carrier body 8 of the metering valve 6 and the control valve 5, through which cooling water taken from the cooling water circuit of the internal combustion engine flows and which ensures intensive cooling of the metering device 4, which is exposed to the hot exhaust gases at the exhaust pipe 1.

The metering valve 6 serves for the metering of a reducing agent, which in the present case is preferably an aqueous urea solution, from which the $NH_3$ for reduction can be split off. This urea solution is held ready in a urea tank 11, which is connected by a line 12 to the metering valve 6. The metering valve is an electrically controlled valve, being controlled by a control unit 14 via the connection 15. The control unit outputs opening signals to the metering valve 6 as a function of values, preferably stored in a characteristic map, in the form of parameters of the internal combustion engine, from which the quantity of urea solution to be introduced into the exhaust gas can be derived. The essential parameters are primarily the quantity of fuel $Q_k$ introduced into the internal combustion engine and the engine speed n, these resulting in a quantity of exhaust gas per unit time in accordance with which the urea is metered in to give an optimum conversion of the $NO_x$ components. Other parameters, such as, for example, the exhaust gas temperature T itself, can be used to draw conclusions with regard to the $NO_x$ components in the exhaust gas which are to be reduced with the aid of the quantity of urea or $NH_3$ introduced.

The control valve 5 serves to control the opening instant and the supply of compressed air which serves for the fine dispersion of the urea in this compressed air and assists its delivery in finely dispersed form into the exhaust gas. The compressed air is fed to the control valve via a compressed air line 16, which is connected to a compressed air reservoir 18 supplied by a compressor 19. A pressure relief valve 20, which reduces the pressure of the air fed to the control valve 5 to 3 bar, is provided to control a uniform pressure. Also connected to the compressed air reservoir 18 is the free air space 21 of the urea tank 11, which is designed as a tank which can be closed in leaktight fashion after being filled. The pressure in this air space is set to 5 bar with the aid of a pressure relief valve 23 arranged in the feed line 22. This pressure provides a pressure difference for the delivery of urea via the metering valve into the region of the control valve, which is supplied with the compressed air. This ensures that, on the one hand, urea can emerge when the metering valve 6 is open and, on the other hand, that the emerging urea can be finely atomized even as it passes through the outlet opening and can mix rapidly with the compressed air present even while the control valve is still closed. When the control valve is subsequently opened, this urea/air mixture is prepared further by the turbulence caused at the outlet opening of the control valve. During the dwell time within the control valve, upstream of the outlet opening of the latter, the air/urea mixture also undergoes temperature conditioning due to the basic heat of the carrier body, which the latter receives from the exhaust system despite being cooled.

Figure 2:
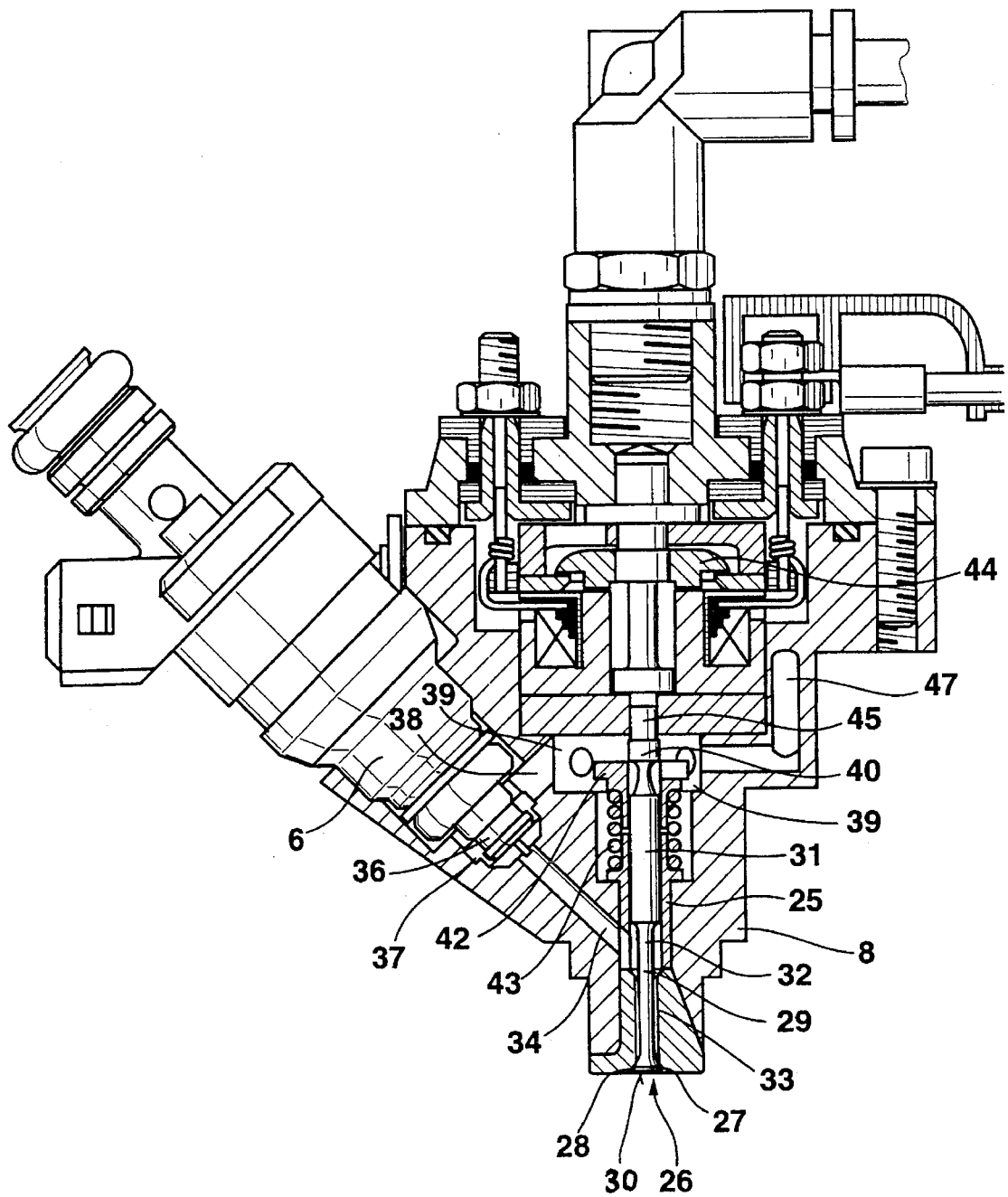

FIG. 2 shows the structure of the control valve and the metering valve. As already mentioned, a common carrier body 8 is provided, arranged in which, in a longitudinal hole, is a guide sleeve 25 with a conical outlet opening 26, situated at the end, which forms a valve seat for a sealing surface 28 of a valve needle 29 in the region of its conical shape. This sealing surface is situated on a head 30 such that the valve needle is in the form of an outward opening valve needle. Within the guide sleeve, a guide shank 31 guided leaktightly in the guide sleeve and a part 32 which is tapered between said guide shank and the head 30 are formed on the valve needle and between the tapered part and the guide sleeve there remains an annular space 33 as a holding space. Opening into this holding space is a connecting passage 34 which leads to the metering valve 6 in the carrier body 8 at an angle to the longitudinal axis of the valve needle. The connecting passage opens into a space 37 which surrounds the outlet end 36 of the metering valve and from which a connecting part 38 leads to an annular space 39 perpendicularly to the longitudinal axis of the metering valve 6. This annular space surrounds that end 40 of the valve needle 29 which emerges from the guide sleeve at the other end from the head 30. At this end 40, the valve needle has a spring plate 42, between the spring plate and the housing there is held a compression spring 43, under the action of which the head 30 of the valve needle is brought into the closed position.

As the metering valve 6 in use is advantageously made of a conventional injection valve as used, for example, in a low pressure petrol injection system, with an appropriately adapted outlet opening which makes this valve suitable for metering in the required very small quantities of urea in time with the cyclic activation of this solenoid valve. The valve needle 29 as part of the control valve is actuated by an armature 44 by way of a tappet 45 which is guided in the carrier housing, the armature being part of a magnet known per se which need not be described in greater detail here. The annular space 39 forms the compressed air inlet space, which is connected in a manner not shown specifically to the compressed air line 16 by a pressure passage 47 in the carrier body 8. With this supply of air, the valve needle is completely surrounded by compressed air, and this compressed air also furthermore surrounds the outlet end of the metering valve 6, taking up the urea emerging at this end and carrying it onward into the annular space 33.

In operation, the metering valve 6 is open for a predetermined time to introduce appropriate quantities of urea into the holding space 33 while the valve needle 29 in other respects remains closed. Following this, the valve needle is pushed open by the actuating movement of the armature 44 and the urea held ready in the holding space is carried out into the exhaust gas through the gap between the valve seat and the sealing surface together with the compressed air. The high exit velocity at this outlet promotes the further preparation of the urea introduced. At the same time, this is also followed by flushing of the metering valve with compressed air, so that, by the next input of urea, the urea previously metered in has been substantially discharged and the risk of clogging of the metering valve and the control valve is thus avoided. The airflow also results in intermediate cooling, which is otherwise performed principally by the cooling water jacket 9.

If introduction of reducing agent is no longer required because the associated internal combustion engine has been stopped, the control valve advantageously continues to be activated for a certain time in order to avoid subsequent heating until the drop in temperature of the exhaust system begins. This also applies to the control of the cooling water circuit and the supply to the cooling water jacket.

In the text above, urea has been used for preference as the reducing agent because of the high efficiency which can be expected and the small quantity to be held in reserve. The use of fuel as the reducing agent instead is also known and this can be introduced here in the same way instead of urea, for which purpose the arrangement described is likewise very well suited.

The forgegoing relates to preferred exemplary embodiments of the invention, it being understood that other variants and embodiments thereof are possible within the spirit and scope of the invention, the latter being defined by the appended claims.

I claim:

1. An arrangement for the aftertreatment of exhaust gases from a compression-ignition internal combustion engine with an exhaust gas collecting system (1) in which a reducing catalytic converter (2) is arranged for the reduction of $NO_x$ components of the exhaust gas from the internal combustion engine, comprising a metering device, said metering device comprising an electrically controlled metering valve (6) for a metered introduction of a reducing agent into a flow of the exhaust gas fed to the catalytic converter (2) as a function of engine operating values, stored in a characteristic map, for the $NO_x$ content of the exhaust gas given various operating parameters of the internal combustion engine and of the catalytic converter, and further comprising an air supply, controlled by a valve (5), from a compressed-air source (18), by means of the air supply the quantities of reducing agent emerging at an outlet end (36) of the electrically controlled metering valve (6) are fed to the exhaust gas finely dispersed in air, wherein the valve for controlling the air supply is an electrically controlled valve (5) which has an outlet opening (26) arranged downstream of the outlet opening of the metering valve (6) and the outlet opening (26) opens directly into the exhaust gas of the internal combustion engine.

2. The arrangement as claimed in claim 1, wherein the control valve (5) is cooled by a cooling medium which flows around a body (8) which holds the said valve.

3. The arrangement as claimed in claim 2, wherein the control valve (5) and the metering valve (6) are arranged in a common carrier body (8) and the metering valve (6) is likewise cooled by the cooling medium via this carrier body (8).

4. The arrangement as claimed in claim 3, wherein the control valve (5) has a valve needle (29) which is actuated by an armature (44) of a magnet and is guided leaktightly in a guide (25) which separates a holding space (33) from a compressed air inlet space (39), and the outlet of the metering valve (6) is connected directly to the holding space (33), and the compressed air inlet space (39) is at the same time connected to an annular space (37) surrounding the outlet part (36) of the metering valve (6).

5. The arrangement as claimed in claim 4, wherein one end of the valve needle (29) projects into the compressed air inlet space (39) and is acted upon in a closing direction by a spring (43), and the end of the armature (44) likewise projects into the compressed air inlet space (39) and comes into contact with the valve needle (29).

6. The arrangement as claimed in claim 5, wherein at an end remote from the compressed-air inlet space (39), the valve needle (29) has a sealing surface (28) with which it can be brought into contact with a valve seat (27) under an action of the spring (43) and, between the guide (25) and the valve seat (27) forms with the housing (8) the annular space (33) as a holding space, into which a connecting passage (34) opens from the direction of the outlet part of the metering valve (6).

7. The arrangement as claimed in claim 6, wherein cooling water from a cooling water circuit of the internal combustion engine is used as the cooling medium.

8. The arrangement as claimed in claim 1, wherein a storage tank (11) for a reducing agent is provided to supply the metering valve, this storage tank being designed as a closed tank which is connected to the compressed air source.

9. The arrangement as claimed in claim 1, wherein urea in aqueous solution is used as the reducing agent.

10. The arrangement as claimed in claim 2, wherein a storage tank (11) for a reducing agent is provided to supply the metering valve, this storage tank being designed as a closed tank which is connected to the compressed air source.

11. The arrangement as claimed in claim 3, wherein a storage tank (11) for a reducing agent is provided to supply the metering valve, this storage tank being designed as a closed tank which is connected to the compressed air source.

12. The arrangement as claimed in claim 4, wherein a storage tank (11) for a reducing agent is provided to supply the metering valve, this storage tank being designed as a closed tank which is connected to the compressed air source.

13. The arrangement as claimed in claim 5, wherein a storage tank (11) for a reducing agent is provided to supply the metering valve, this storage tank being designed as a closed tank which is connected to the compressed air source.

14. The arrangement as claimed in claim 6, wherein a storage tank (11) for a reducing agent is provided to supply the metering valve, this storage tank being designed as a closed tank which is connected to the compressed air source.

15. The arrangement as claimed in claim 7, wherein a storage tank (11) for a reducing agent is provided to supply the metering valve, this storage tank being designed as a closed tank which is connected to the compressed air source.

16. The arrangement as claimed in claim 2, wherein urea in aqueous solution is used as the reducing agent.

17. The arrangement as claimed in claim 3, wherein urea in aqueous solution is used as the reducing agent.

18. The arrangement as claimed in claim 4, wherein urea in aqueous solution is used as the reducing agent.

19. The arrangement as claimed in claim 5, wherein urea in aqueous solution is used as the reducing agent.

20. The arrangement as claimed in claim 6, wherein urea in aqueous solution is used as the reducing agent.

* * * * *